(12) United States Patent  
Van Driel

(10) Patent No.: US 8,876,008 B2  
(45) Date of Patent: Nov. 4, 2014

(54) BALL WITH POSITIONING SYSTEM

(75) Inventor: John Van Driel, Kapel Avezaath Buren (NL)

(73) Assignee: Satworld Holdings B.V. (NL)

( * ) Notice: Subject to any disclaimer, the term of this patent is extended or adjusted under 35 U.S.C. 154(b) by 378 days.

(21) Appl. No.: 13/041,088

(22) Filed: Mar. 4, 2011

(65) Prior Publication Data

US 2011/0215977 A1   Sep. 8, 2011

(30) Foreign Application Priority Data

Mar. 5, 2010  (EP) .................................. 10155633

(51) Int. Cl.
| | | |
|---|---|---|
| *G06K 19/077* | (2006.01) | |
| *G06K 19/04* | (2006.01) | |
| *A63B 37/00* | (2006.01) | |
| *G01V 15/00* | (2006.01) | |
| *A63B 24/00* | (2006.01) | |

(52) U.S. Cl.
CPC ...... *A63B 37/0003* (2013.01); *G06K 19/07728* (2013.01); *G06K 19/045* (2013.01); *A63B 2225/54* (2013.01); *A63B 2024/0053* (2013.01); *A63B 2225/50* (2013.01); *G06K 19/07749* (2013.01); *A63B 37/0055* (2013.01); *G01V 15/00* (2013.01)

USPC ..................... 235/492; 340/572.1; 340/572.7; 340/572.8

(58) Field of Classification Search
CPC ....... H01Q 1/2225; H01Q 1/22; H01Q 9/265; H01Q 9/26
USPC .................. 235/492; 340/572.1, 572.7, 572.8
See application file for complete search history.

(56) References Cited

U.S. PATENT DOCUMENTS

| | | | |
|---|---|---|---|
| 6,620,057 B1 | 9/2003 | Pirritano et al. | |
| 7,859,416 B2 * | 12/2010 | Tuttle .......................... | 340/572.8 |
| 2005/0070376 A1 | 3/2005 | Savarese et al. | |
| 2006/0043199 A1 | 3/2006 | Baba et al. | |
| 2007/0046475 A1 | 3/2007 | Carrender | |
| 2009/0253526 A1 | 10/2009 | Koudele et al. | |

FOREIGN PATENT DOCUMENTS

WO     01/02060     1/2001

* cited by examiner

*Primary Examiner* — Robert Karacsony  
(74) *Attorney, Agent, or Firm* — Meyer IP Law Group

(57) ABSTRACT

A ball (1) for use in a sporting activity can comprise a body having an electrical circuit (21) on a flexible substrate (20) received therein. The electrical circuit (21) comprises a dipole antenna (26) integrally formed with the electrical circuit (21) on the flexible substrate (20). The dipole antenna can comprise two arms (23, 24) each folded in a semi-circular shape.

13 Claims, 3 Drawing Sheets

BALL WITH POSITIONING SYSTEM

CLAIM OF PRIORITY

This application claims the benefit of priority from the following application, incorporated by reference herein: European Patent Application No. 10155633.0 entitled "BALL WITH POSITIONING SYSTEM AND POSITIONING SYSTEM FOR A BALL;" by inventor John Van Driel; filed on Mar. 5, 2010.

FIELD OF THE INVENTION

The invention relates to a ball for use in a sporting activity.

BACKGROUND

From US 2009/0137340 a golf ball is known having a tracking system. A microchip is embedded in the ball. The microchip can send information specific for the location to a receiver of a tracking system. This allows the user to track the golf ball.

The electrical system received in the ball, especially a golf ball, will experience intense shocks. The electrical system should be shockproof.

SUMMARY OF THE INVENTION

It is a goal of the invention to provide an improved ball for use in a sporting activity.

According to an aspect of the invention an improved ball comprises a substrate being a flexible substrate, an electrical circuit on the flexible substrate received therein, the electrical circuit comprises a dipole antenna integrally formed with the electrical circuit on the flexible substrate, the dipole antenna comprising two arms each folded in a semi-circular shape. The flexible substrate carries the antenna, making the antenna flexible. The flexible antenna can be connected to a further electrical circuit. The further electrical circuit can comprise a further substrate, e.g. a ceramic substrate. The semi-circular shape will result in an antenna radiating omni-directionally.

By forming both the electrical circuit and the antenna on the substrate in a single printing step, costs for production are reduced. Further forming both the electrical circuit and antenna on a single substrate allows an integral electrical connection between the circuit and the antenna, making a separate connection between the two redundant.

Repeated shock tests resulted in broken electrical circuits in the ball. By replacing the ceramic substrate by a flexible substrate, sport balls and specifically golf balls proved to be more durable. The substrate material has a low elastic modulus. In an embodiment the Young's modulus of the flexible substrate material is less than 5 GPa.

In an embodiment the flexible substrate is provided with a slot to receive the ends of the arms of the dipole antenna. In this arrangement the arms maintain the semi-circular fold.

In an embodiment the substrate is a polymer, more specifically a liquid crystalline polymer (LCP). Such substrates are known as such and are available from e.g. Rogers Corporation. The polymer substrates can comprise single or multi-layer constructions. A laminate circuit material can be adhesiveless.

Further the laminate circuit material can be formed having a specific surface area. The surface area of the substrate can be cut or punched into a desired shape. This specifically allows forming the substrate and circuit formed thereon to have round shaped to be received in the body of the ball. The laminate circuit material can be 50 µm-100 µm thick. Further the printed circuit can be a circuit created from copper. Both sides of the laminate can be printed. Via's can be used to connect the circuits formed on both sides.

In an embodiment the flexible substrate or laminate is formed to have connectors or engaging elements to allow connecting the substrate with the interior of the ball. The connector can be a hook like element. The connector can be formed by punching the laminate.

In an embodiment the electrical circuit is an antenna.

By forming the antenna on the laminate circuit material the flexible substrate can be punched or cut into a desired surface area, in particular in the form of the antenna. The antenna preferably comprises to individual arms. In an embodiment the arms are positioned adjacent each other. A cut divides the two arms. At the connecting end of the arms (proximal to the circuit) a further (unplated) hole can be formed, e.g. by punching to prevent subsequent tearing of the substrate.

In an embodiment the antenna is folded out of a primary surface of the electrical circuit. By forming the antenna on the flexible substrate, the antenna is formed in a two dimensional surface. The flexible substrate allows bending of the antenna out of the original or primary surface of the flexible substrate. By folding a three dimensional antenna is obtained allowing transmittal of signal in all directions, improving the reception of that signal by a tracking system operated by a user.

In an embodiment the flexible substrate having the antenna comprises a connector, formed e.g. by punching, for allowing to connect the folded antenna to another part of the substrate.

In an embodiment the substrate comprises the electrical circuit formed on a first surface of the substrate. At one end of the first surface the antenna is formed, extending from the first surface. At least a part of the antenna can be folded an connected to an opposite end of the first surface. This allows folding the antenna part to a semi-circle. This will increase cross polarization. Although the cross polarization will influence the quality (gain) of the antenna, a ball such as a golf ball will land in any orientation to the ground, allowing radiating partly with horizontal and partly with vertical polarization. This decreases the antenna gain but a vertically polarized EM wave does propagate better close to the ground.

In an embodiment the flexible substrate is formed with two arms carrying the antenna, extending from a first surface having the electrical circuit. Both arms are folded into a semi-circular shape. This antenna can be formed having a center frequency around 2442 MHz and can function in a band of 2400 MHz to 2483 MHz.

In an embodiment surface mounted devices (SMD) are mounted on the substrate connected to the electrical circuit. An example of a SMD is a transmitter. The transmitter can be a Texas Instruments. Preferably a digital transmitter is used.

In an embodiment the electrical circuit comprises a ID-tag as surface mounted device. The ID-tag identifies the ball. The ID-tag can be sent with the signal transmitted by the transmitter in the ball. This allows distinguishing one ball from the other or one signal from a signal from another ball. In an embodiment a tracking system arranged to receive signals from the ball according to the invention is programmed to identify the ID-tag of that ball. This could be a initiation step of the method to track the ball. The tracking system is put in a 'initiate tracking' modus wherein the ball to be tracked is positioned in the direct vicinity of the tracking system. The tracking system identifies the ball and memories the ID-tag. Other methods for 'programming' the tracking system to follow a certain ball are also possible.

In an embodiment a battery is connected to the electrical circuit. The battery has connectors to connect to the electrical circuit and is also received in the body of the ball. In an embodiment the connectors are formed as plated holes in the substrate formed during production of the electrical circuit on the substrate.

In an embodiment the electrical circuit in a hardened foam body such as a polyurethane body. The body surrounds the electrical circuit. The foam body is an internal body of the ball. The foam body allows to fill up a three dimensional space. The body will dampen or absorb shocks exerted on the ball. In an embodiment the foam body with electrical circuit is received in a body of PBD surrounded by a hardened coating.

In an embodiment the ball comprises several layers of synthetic materials. In an embodiment the ball has a dimpled surface. This ball can be used as golf ball.

In an embodiment the electrical circuit can comprise an accelerometer or a similar device arranged to detect acceleration of the ball. Detection of the acceleration results in allowing power to reach the transmitter to send the tracking signal from the ball. This allows saving power when the ball is not used.

For determining the position of a ball a positioning system having a receiver is used. The positioning system is a handheld device comprising a battery. In an embodiment the electronic system within the ball is able to identify its position, e.g. by using the Global Positioning System and sending coordinates to the positioning system. In another embodiment the positioning system comprises a receiver for receiving an identification signal from the electronic system received in the ball, the receiver being a directional receiver, able to identify from which direction the identification signal was sent. The receiver can comprise at least one directional antenna. Multiple antennas can be used to determine a distance.

The positioning system can comprise a display to display an image representing the received signal. The image can be a number. Reference is made to application NL 2003209, the complete disclosure thereof being incorporated in this application.

According to a further aspect a method for assembling a ball is provided. The method comprises providing laminate and preparing the laminate for printing. The method comprises printing the laminate. Further steps of the method can comprise etching drilling via's and plating via's. Part of printing is forming a electrical circuit and forming the antenna, preferably a dipole antenna.

A subsequent step of the method can comprise punching out or laser milling along contours the flexible substrate. This will allow to shape the substrate with electrical circuit and antenna.

The method further comprises picking and placing surface mounted devices onto the electrical circuit. The SMD's could be soldered.

Subsequently the method can comprise attaching to the substrate a battery.

The step of punching can comprise shaping antenna parts in the form of arms extending from a first surface of the substrate having the electrical circuit. These arms can be folded over both sides of the first surface in a semi-circular fashion. During the punching step a slot can be formed in the substrate. The antenna arms can be connected to these slot such that the folded arms maintain the semi-circular fold.

In a further method step the device having the folded arm is received in a mould and a hardening foam is moulded.

Although the invention is described in detail in this application, it will be clear that many variations are possible within the scope of the invention. The invention is not limited to the shown embodiments. Further, although a invention is indicated in the claims, this application discloses many technical features comprising improvements of the prior art. Any of these features having explicitly or implicitly disclosed advantages could be the subject of patent protection, perhaps in a subsequent divisional application.

BRIEF DESCRIPTION OF THE DRAWINGS

The invention will now be described referring to the drawing, wherein.

DETAILED DESCRIPTION

Figure 1:
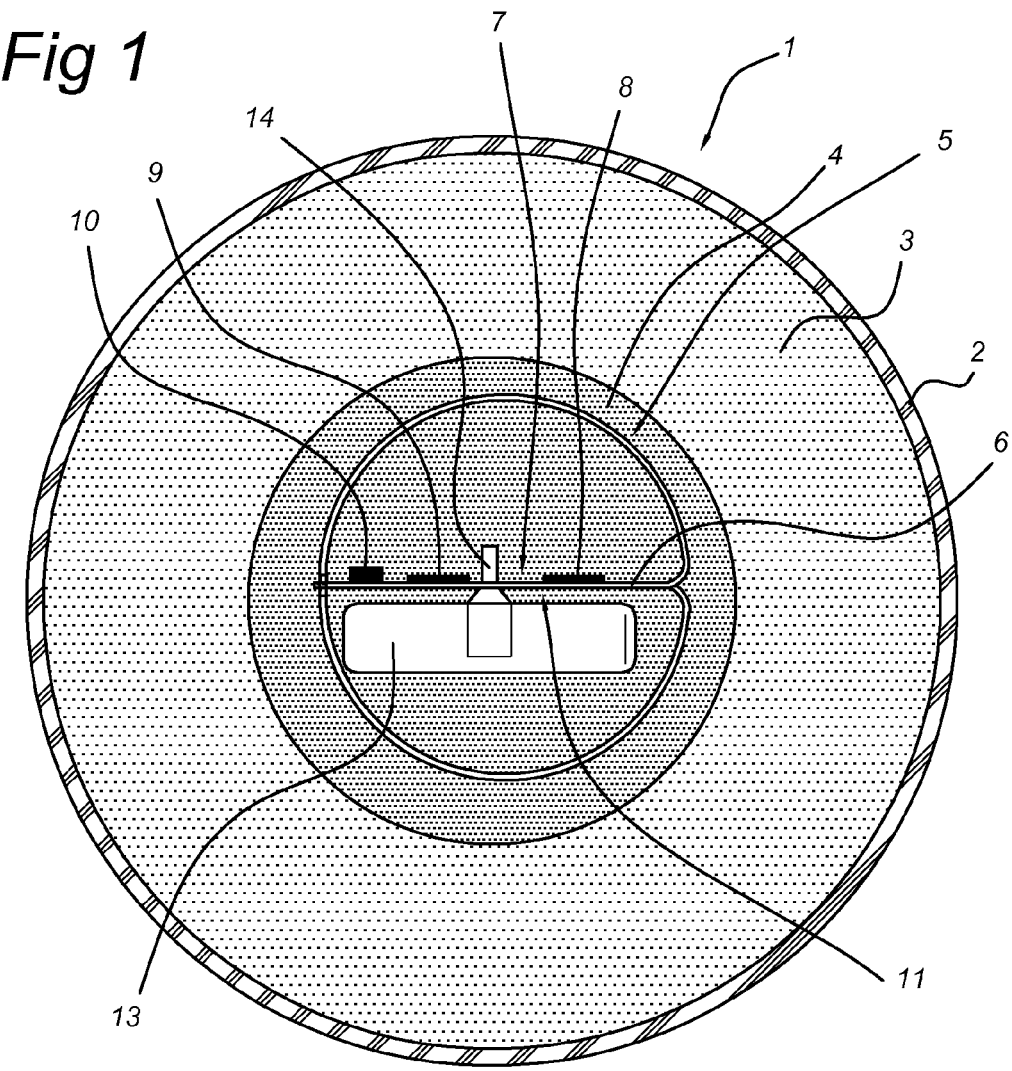
FIG. 1 is a cross sectional view of a golf ball according to a first embodiment of the invention.

FIG. 1 shows a cross sectional view of a golf ball 1. A coating of ionomer 2 surrounds a body of PBD in which a moulded body of polyurethane (PUR) 4 is received. The PUR 4 is formed into a sphere. In the spherical mould a device 5 according to the invention was centered. Foam is injected into the mould (not shown separately) and hardens. Injecting the foam into the mould results in filling up all or generally all spaces surrounding the device 5. The PUR 4 forms a protective cover surrounding the device 5. It will absorb shocks.

The device 5 comprises a first surface 6. Onto a first side 7 of the device 5 surface mounted device (SMD) 8-10 are mounted. In an embodiment SMD 8 is a Texas Instruments CC2550 arranged to perform transmitter functions. A further SMD 9 could be a microcontroller. Another SMD 10 could be a FET.

The substrate 6 is a flexible substrate such as a liquid crystalline polymer available from Rogers corporation sold under the trademark name ULTRALAM® 3850. The flexible substrate 6 allows folding of parts thereof.

An electrical circuit can be formed on either or both sides 7,11 of the surface 6. Via's can be formed through the substrate connecting the formed circuits at both sides.

A battery 14 is also connected to the substrate and electric circuit formed on the substrate. The battery 14 has connectors 13. In FIG. 1 connector 13 passes through a plated slot to make a connection with the electrical circuit formed on the substrate 6.

The transmitter device of substrate, antenna, battery and SMDs has a center of gravity. This center of gravity is determined mostly by the battery. The center of gravity is positioned in the middle of a mould to be filled with the foam such a PUR to surround the transmitter device. In an embodiment an additional hole is provided in the first surface to allow air present between battery and substrate to escape and to allow foam to penetrate into this space.

Figure 2:
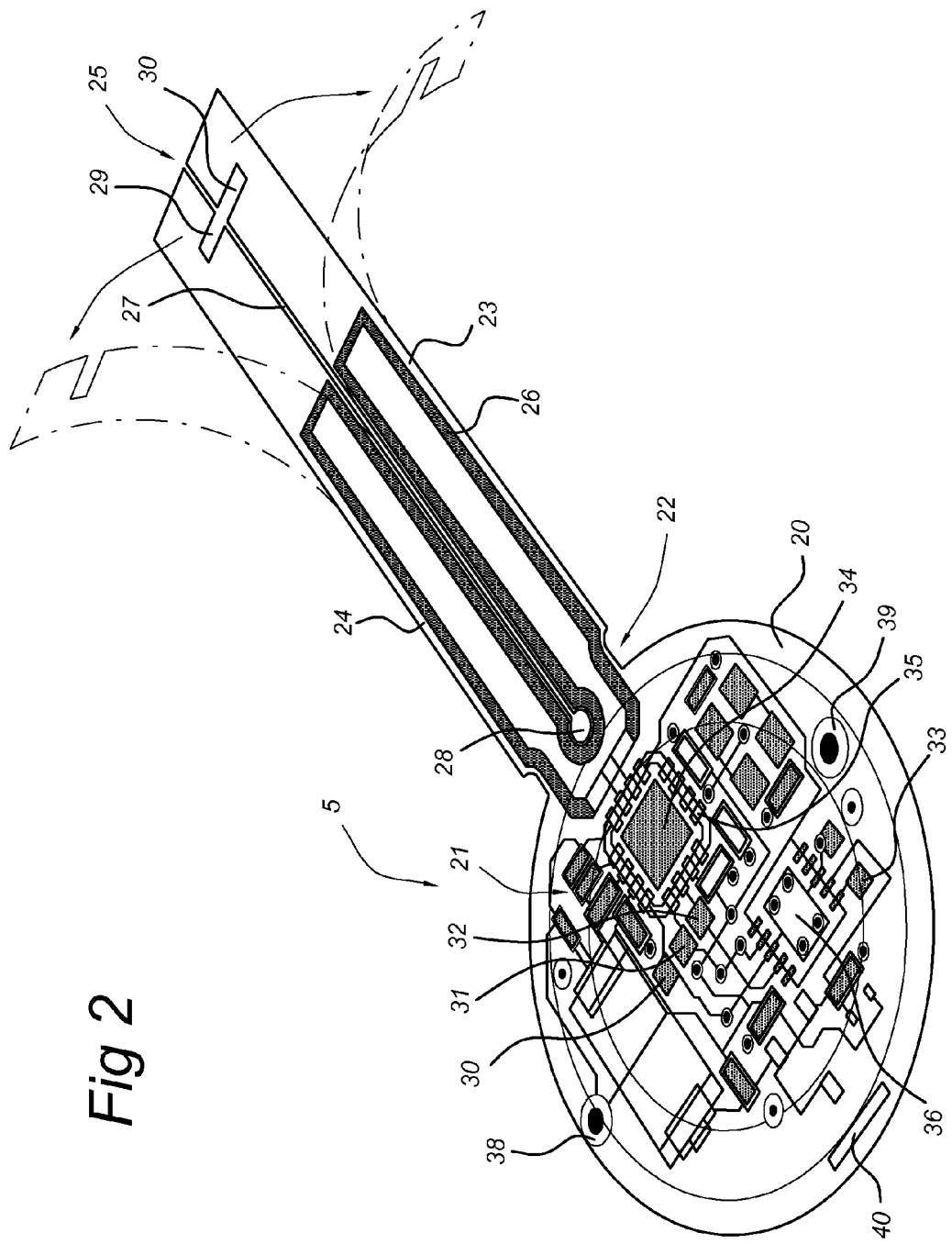
FIG. 2 is a view of a flexible circuit to be used in a ball according to an embodiment of the invention.

FIG. 2 shows a flexible substrate 20 having an electrical circuit 21. The substrate 20 is formed from a laminate such as a liquid crystalline polymer, and was shaped as a result of punching or laser milling. The flexible substrate allows bending of the substrate and (part of) the electric circuitry.

A first circular surface of the substrate 20 has the electrical circuitry 21. At one end 22 two arms 23,24 of the flexible substrate extend towards end 25. On the arms 23,24 parts of antenna 26 are printed to form a dipole antenna. The arms 23,24 are separated by a cut 27. The cut 27 ends in an unplated hole 28 preventing further tearing of cut 27.

Near end 25 arms 23,24 are provided with cuts 29,30 forming hook like connectors.

Circuit 21 comprises shaded parts. These shaded parts comprise SMDs. SMD 34 is a transmitter. The transmitter 34 will be connected to the connectors 35. Connecting can comprise soldering. In this embodiment SMDs 30-32 are MOSI, SCK and MISO respectively. A reset 33 is also indicated. A microcontroller 36 is indicated. Further SMDs comprise resistors and capacitors. Electrical connectors and vias are also indicated schematically.

Substrate 20 comprises a slot 40 formed by punching. The slot 40 can receive the hooks formed by cuts 29,30 at end 25 of arms 23,24. Arms 23,24 can be folded, as indicated by the dotted lines, as a result of using the flexible substrate.

Figure 3:
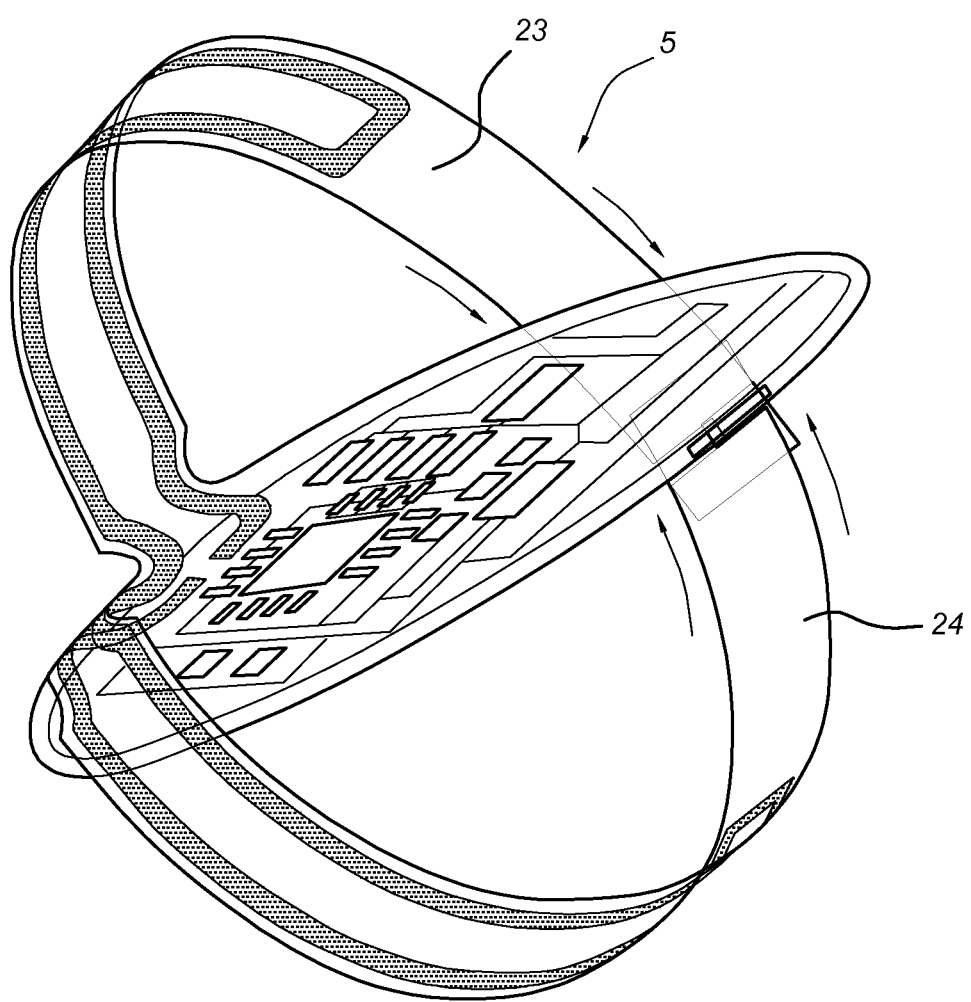
FIG. 3 is a perspective view of a folded flexible circuit according to the embodiment of FIG. 2.

FIG. 3 shows the device 5 in folded state. Arms 23,24 are folded semi-circular.

Electrical circuit 21 further comprises plates slots (or holes) 38,39 formed for receiving a connector of the battery.

The folded antenna allows sending an identification signal in all directions. The identification signal comprises a representation of the unique ID-tag. The signal can be received by a positioning system that can identify the signal, and if arranged with a directional antenna, can locate the ball with electronic circuit. The received signal and its position can be interpreted in a processor of the handheld positioning system and the interpreted data can be represented on a display of the positioning system allowing a user to know the location of the ball.

What is claimed is:

1. A ball (1) for use in a sporting activity comprising a body having an electrical circuit (21) on a flexible substrate (20) received therein, the electrical circuit (21) comprises a dipole antenna (26) completely integrally formed with the electrical circuit (21) on the flexible substrate (20), the dipole antenna comprising two arms (23, 24) each folded in a semi-circular shape, wherein the flexible substrate is provided with a slot (40) to receive the ends (25) of the arms (23,24) of the dipole antenna.

2. The ball according to claim 1, wherein the flexible substrate (20) is a laminate.

3. The ball according to according to claim 1, wherein the substrate (20) is punched.

4. The ball according to according to claim 1, wherein the substrate (20) is formed having connectors (38, 39, 40).

5. The ball according to claim 4, wherein the antenna (23) is folded out of a primary surface of the electrical circuit (21).

6. The ball according to according to claim 1, wherein surface mounted devices (30, 31, 32, 34) are mounted on the substrate and connected to the electrical circuit.

7. The ball according to claim 6, wherein the electrical circuit comprises a transmitter (34) as surface mounted device.

8. The ball according to claim 6, wherein the electrical circuit comprises an identification (ID) tag (36) as surface mounted device.

9. The ball according to according to claim 1, wherein a battery (13) is connected to the electrical circuit.

10. The ball according to according to claim 1, wherein the electrical circuit (21) and substrate (20) is received in a body of polyurethane (4).

11. The ball according to according to claim 1, wherein the electrical circuit (21) is received in a hardened foam body (4) received in a body of power distribution board (PBD) (3) surrounded by a hardened coating (2).

12. The ball according to according to claim 1, wherein the ball (1) comprises several layers of synthetic materials.

13. The ball according to according to claim 1 having a dimpled surface (2).

\* \* \* \* \*